United States Patent [19]

Koumoto et al.

[11] Patent Number: 5,027,309

[45] Date of Patent: Jun. 25, 1991

[54] DIGITAL DIVISION CIRCUIT USING N/M-BIT SUBTRACTOR FOR N SUBTRACTIONS

[75] Inventors: Yasuhiko Koumoto; Kei Tokunaga, both of Tokyo, Japan

[73] Assignee: NEC Corporation, Tokyo, Japan

[21] Appl. No.: 400,135

[22] Filed: Aug. 29, 1989

[30] Foreign Application Priority Data

Aug. 29, 1988 [JP] Japan .................................. 63-213884

[51] Int. Cl.$^5$ .............................................. G06F 7/52
[52] U.S. Cl. .................................................. 364/766
[58] Field of Search ................................... 364/761–767

[56] References Cited

U.S. PATENT DOCUMENTS

| 4,414,692 | 11/1983 | Grube | 364/766 |
| 4,692,891 | 9/1987 | Yamaoka et al. | 364/766 |
| 4,817,048 | 3/1989 | Rawlinson et al. | 364/763 |

OTHER PUBLICATIONS

Sanyal, "An Algorithm for Nonrestoring Division", *Computer Design*, May 1977, pp. 124–127.

*Primary Examiner*—Dale M. Shaw
*Attorney, Agent, or Firm*—Foley & Lardner

[57] ABSTRACT

In a division circuit, a dividend register (7) and a remainder register (14) are connected so that a bit in the MSB of the former is shifted to the LSB of the latter. Higher bits of an N-bit divisor are monitored by a detector (18) and a zero-detect (ZD) signal is generated when they are all "0"s. In the presence of the ZD signal, subtraction is performed by an N/2-bit subtractor (28) between lower-bit data of a divisor and data in the remainder register and, in the absence of the ZD signal, first subtraction is performed between lower-bit data of the divisor and higher-bit data of the dividend register (7) and second subtraction is performed between higher-bit data of the divisor register and data in the remainder register (14). A "1" is written into the LSB of the dividend register (7) either in response to a "1" in the MSB of the remainder register (14) or when no borrow results from subtractions. In the presence of the ZD signal, the result of each subtraction is stored in a first latch, the remainder and dividend registers are one-bit shifted and the remainder register (14) is loaded with the stored data when a "1" is stored into the LSB of the dividend register. In the absence of the ZD signal, the results of subtraction are respectively stored in first and second latches (12;71,8;72), and the registers (14,7) are shifted and loaded with the stored data when a "1" is stored into the LSB of the dividend register (7). A quotient and a remainder are derived from the dividend and remainder registers after subtraction is repeated N times.

4 Claims, 7 Drawing Sheets

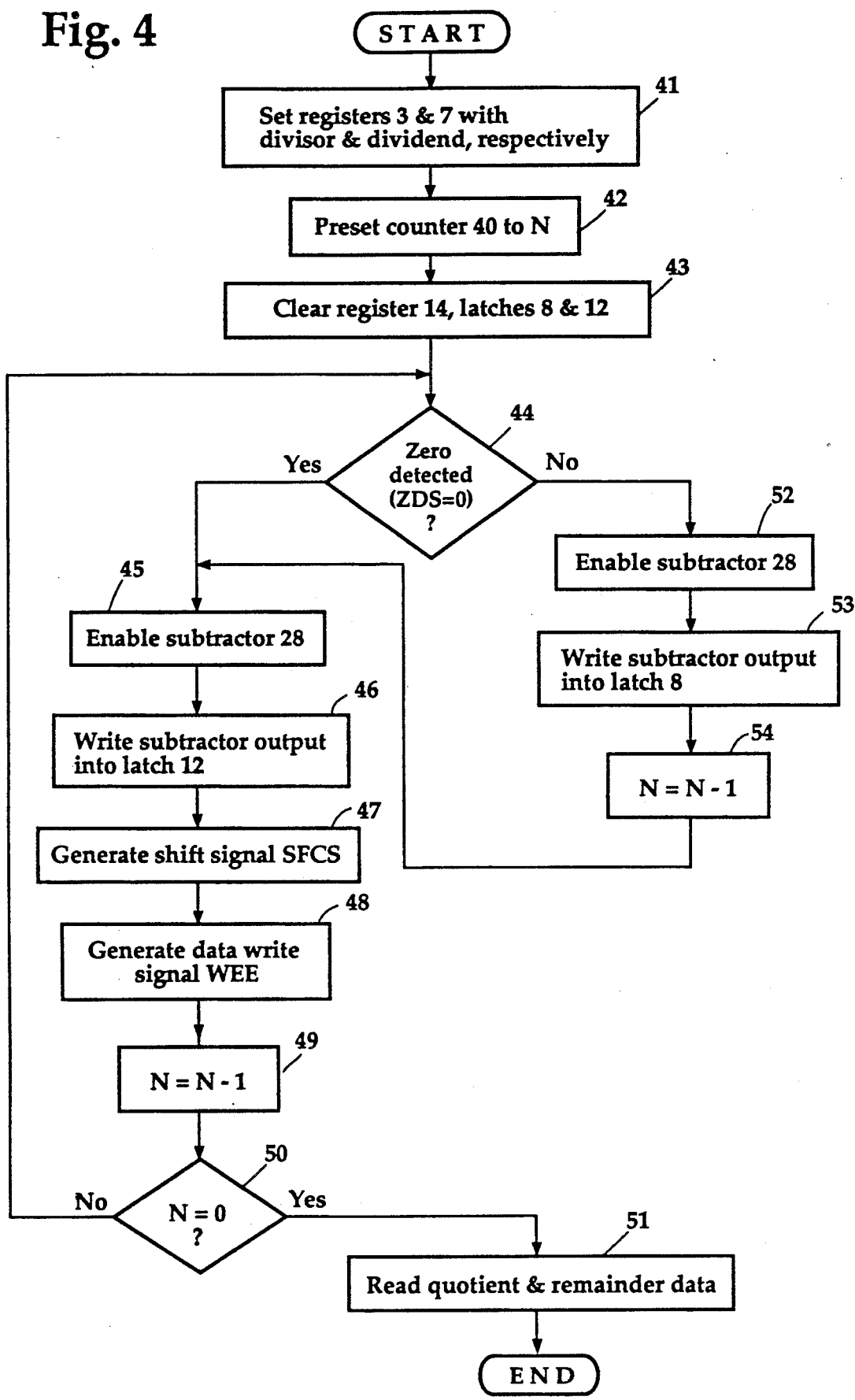

Fig. 5 Dividend = 01010101 (=decimal 85): Divisor = 0000 1100 (=decimal 12)

| State | Remainder Reg. 14 | Dividend Register 7 | Output Data Latch 12 | MPX 20 | MPX 24 |
|---|---|---|---|---|---|
| 0 | 0000 | 01010101 | 0000 | 1100 | 0000 |
| 1 | 0000 | 10101010 | 0100 | 1100 | 0001 |
| 2 | 0001 | 01010100 | 0101 | 1100 | 0010 |
| 3 | 0010 | 10101000 | 0110 | 1100 | 0101 |
| 4 | 0101 | 01010000 | 1001 | 1100 | 1010 |
| 5 | 1010 | 10100000 | 0110 | 1100 | 0101 |
| 6 | 1001 | 01000001 | 1001 | 1100 | 0010 |
| 7 | 0110 | 10000011 | 0110 | 1100 | 1101 |
| 8 | 0001 | 00000111 | 0001 | 1100 | 0010 |

Dividend Register 7: Quotient (lower portion)
Remainder Reg. 14: Lower 4 bits of remainder

Fig. 6

Dividend = 01010101 (=decimal 85): Divisor = 00101100 (=decimal 44)

Output Data

| State | Remainder Reg. 14 | Dividend Register 7 | Latch 12 | Latch 8 | MPX 20 | MPX 24 |
|---|---|---|---|---|---|---|
| 00 | 0000 → 0000 | 01010101 → 01010101 | 0000 → 0000 | 0000 | 1100 | 1010 |
| 01 | 0000 → 0000 | 10101010 → 10101010 | 1101 → 1101 | 0110 → 0110 | 0010 +1 | 0000 |
| 02 | 0000 → 0000 | 10101010 → 10101010 | 1110 → 1110 | 1001 → 1001 | 1100 | 0101 |
| 03 | 0000 → 0001 | 10101010 → 10101100 | 1111 → 1111 | 1001 → 1001 | 0010 +1 | 0001 |
| 04 | 0001 → 0001 | 10101100 → 01010100 | 1111 → 1111 | 0110 → 0110 | 1100 | 1010 |
| 05 | 0001 → 0010 | 01010100 → 10101000 | 1111 → 1111 | 0110 → 0110 | 0010 +1 | 0010 |
| 06 | 0010 → 0010 | 10101000 → 10101000 | 1111 → 1111 | 1001 → 1001 | 1100 | 0101 |
| 07 | 0010 → 0010 | 10101000 → 10010001 | 0010 | 1001 | 0010 +1 | 0101 |
| 08 | 0010 | 10010001 | | | 1100 | 0010 |

Remainder — Lower 4 bits of quotient

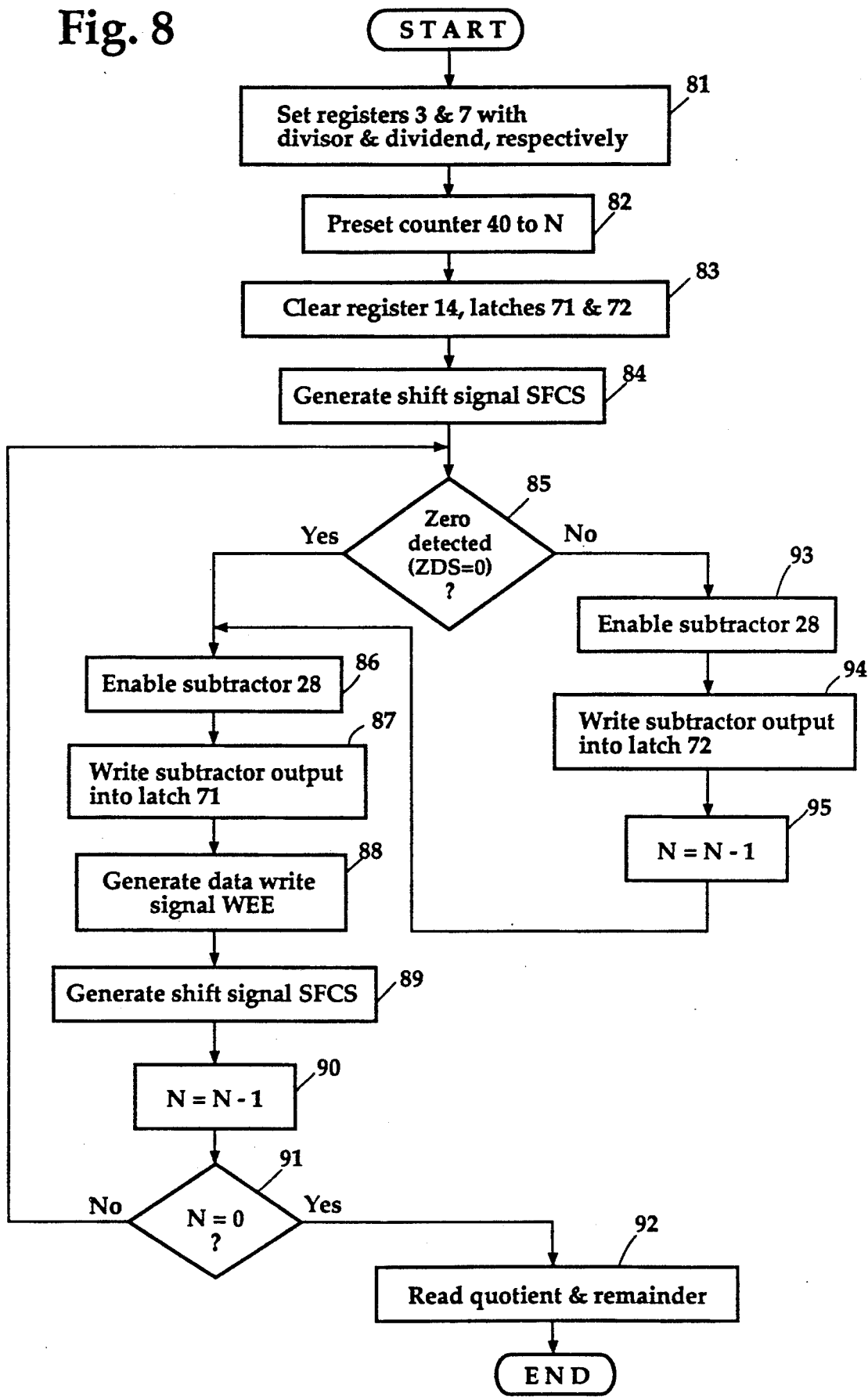

DIGITAL DIVISION CIRCUIT USING N/M-BIT SUBTRACTOR FOR N SUBTRACTIONS

BACKGROUND OF THE INVENTION

The present invention relates generally to digital computers, and more specifically to a digital division circuit incorporated in the computers.

In a digital division operation, an N-bit dividend "A" is divided by an N-bit divisor "B" of nonzero value by repeatedly performing subtraction between them according to an algorithm known as the non-restoring method to derive an N-bit quotient "C" and N-bit remainder "D". If B is zero, the operation is treated as being invalid. The non-restoring method involves the steps of repeating subtractions N times by shifting registers. In the first step, the divident A and divisor B are set into a dividend register and a divisor register, respectively, and a remainder register is cleared to zero. In the second step, the divisor B is subtracted from data which comprises the lower (N−1) bits of the remainder register and the most significant bit of the dividend register. If the subtraction fails, a "0" is written into the least significant bit position of the dividend register and both dividend and remainder registers are shifted one bit to the left (toward the most significant bit position), so that the MSB of the dividend register is shifted out into the LSB of the remainder register. If the subtraction is successful, a "1" is written into the LSB of the dividend register and the dividend and remainder registers are both shifted one bit to the left, and the result of the subtraction is written into the remainder register. When the second step is repeated N times, the quotient of the division operation is obtained by the dividend register and the remainder of the division is obtained by the remainder register.

Since the digital calculation circuitry is required to meet the recent demands for higher performance and higher level of sophistication, the number of bits which can be treated has increased and, hence, the amount of hardware has increased significantly. To keep the hardware to a minimum, a proposal has been made to implement a subtractor with (N/2)-bit circuitry by separating N-bits operands into lower- and higher-bit segments and performing a subtraction first on the lower-bit segments and then on higher-bit segments and combining the results of the respective subtractions. However, subtractions must be performed 2N times and hence there is an increase in the calculation time.

SUMMARY OF THE INVENTION

It is therefore an object of the present invention to provide a digital division circuit which requires a minimum of hardware and operates at a high speed.

Another object of the invention is to provide a digital division circuit in which subtractions are performed N times using an N/2-bit subtractor.

According to a broader aspect of the present invention, there is provided a digital division circuit for dividing a dividend by a divisor in accordance with a non-restoring method, which includes a first register having a data shift function for temporarily storing the dividend therein, a second register for temporarily storing the divisor, a third register having a data shift function, and a subtractor, wherein the division circuit divides the dividend by the divisor in accordance with the non-restoring method. The present invention is characterized by a zero detector that monitors higher-bit data of the divisor in the second register and generates a signal when the monitored higher-bit data is all zero. A first multiplexer is connected between the second register and a first input terminal of the subtractor for supplying lower-bit data of the divisor to the subtractor in response to the signal from the zero detector and selectively supplying lower-bit and higher-bit data of the divisor to the subtractor for each subtraction operation thereof in the absence of the signal from the zero detector. A second multiplexer is connected between the first and third registers on the one hand and a second input terminal of the subtractor on the other hand for supplying the contents of the third register to the subtractor in the presence of the signal from the zero detector and selectively supplying higher-bit data of the contents of the third and first registers to the subtractor for each subtraction thereof in the absence of the signal from the zero detector.

Since the data supplied to the subtractor of the present invention is selected on the basis of whether the higher bit data of a divider is all zero or not, division operation can be performed at a high speed without increasing the hardware. Specifically, when the higher bits of the divisor are all zero, the higher bits of a remainder becomes all zero and therefore the subtraction is performed on the lower bits of the divisor and the content of the remainder register. On the other hand, when the higher bits of the divisor are not all zero, the higher bits of the quotient become all zero and, therefore, a first subtraction is performed on the lower bits of the divisor and the higher bits of the dividend and a second subtraction is performed on the higher bits of the divisor and the content of the remainder register. In this way, N-bits operands can be processed by an N/2 bit subtractor by performing subtractions N times.

According to a specific aspect, the division circuit of the present invention comprises and N-bit divisor register for storing an N-bit divisor, and N-bit dividend register for storing an N-bit dividend, and an N/M-bit remainder register which stores a bit shifted out of the most significant bit (MSB) position of the dividend register into the least significant bit (LSB) position thereof, where M is an integer equal to or greater than 2 and smaller than N. A zero detector is provided for monitoring a higher-bit segment of the divisor to generate a signal indicating that the higher-bit segment of the divisor is all "0"s.

In the presence of the signal from the zero detector, a lower-bit segment of data in the divisor register is repeatedly subtracted by an N/M-bit subtractor from data in the remainder register, and an output generated from each of the subtractions is written into a first latch. The remainder and dividend register are controlled to effect the one-bit shifting in response to each subtraction and data from the first latch is written into the remainder register either when a "1" appears in the most significant bit position of the remainder register or when a borrow bit is not generated by subtraction. A quotient and a remainder are derived from the dividend and remainder registers, respectively, when subtraction is repeated N times.

In the absence of the signal from the zero detector, a lower-bit segment of data in the divisor register is subtracted from a higher-bit segment of data in the dividend register and then a higher-bit segment of data in the divisor register is subtracted from data in the remainder register in repeated sequences, and outputs successively generated from the subtractions of each sequence are written into second and first latches, rspectively. The remainder and dividend registers are controlled to effect the one-bit shifting in response to each of said sequences and data from the first and second latches are written into the remainder and dividend registers, respectively, when a borrow bit is generated by subtraction. A "1" is added to the least significant bit position of the higher-bit segment data from the divisor register in response to the borrow bit. A quotient is derived from the dividend register and a remainder is derived from the remainder and dividend registers when the subtraction is repeated N times. A logic gate circuit writes a "1" into the least significant bit position of the dividend register either when a "1" appears in the most significant bit position of the remainder register or when said borrow bit is not generated.

BRIEF DESCRIPTION OF THE DRAWINGS

The present invention will be described in further detail with reference to the accompanying drawings, in which:

FIG. 4 is a flowchart describing a sequence of programmed instructions performed by the sequence controller of FIG. 1;

FIG. 5 shows a list of binary numbers successively generated in the division circuit of FIG. 1 when divisor and dividend are "00001100" (=decimal 12) and "01010101" (=decimal 85), respectively;

FIG. 6 shows a list of binary numbers successively generated in the division circuit of FIG. 1 when divisor and divided are "00101100" (=decimal 44) and "01010101" (=decimal 85), respectively;

FIG. 8 is a flowchart associated with the sequence controller of FIG. 7.

DETAILED DESCRIPTION

Figure 1:
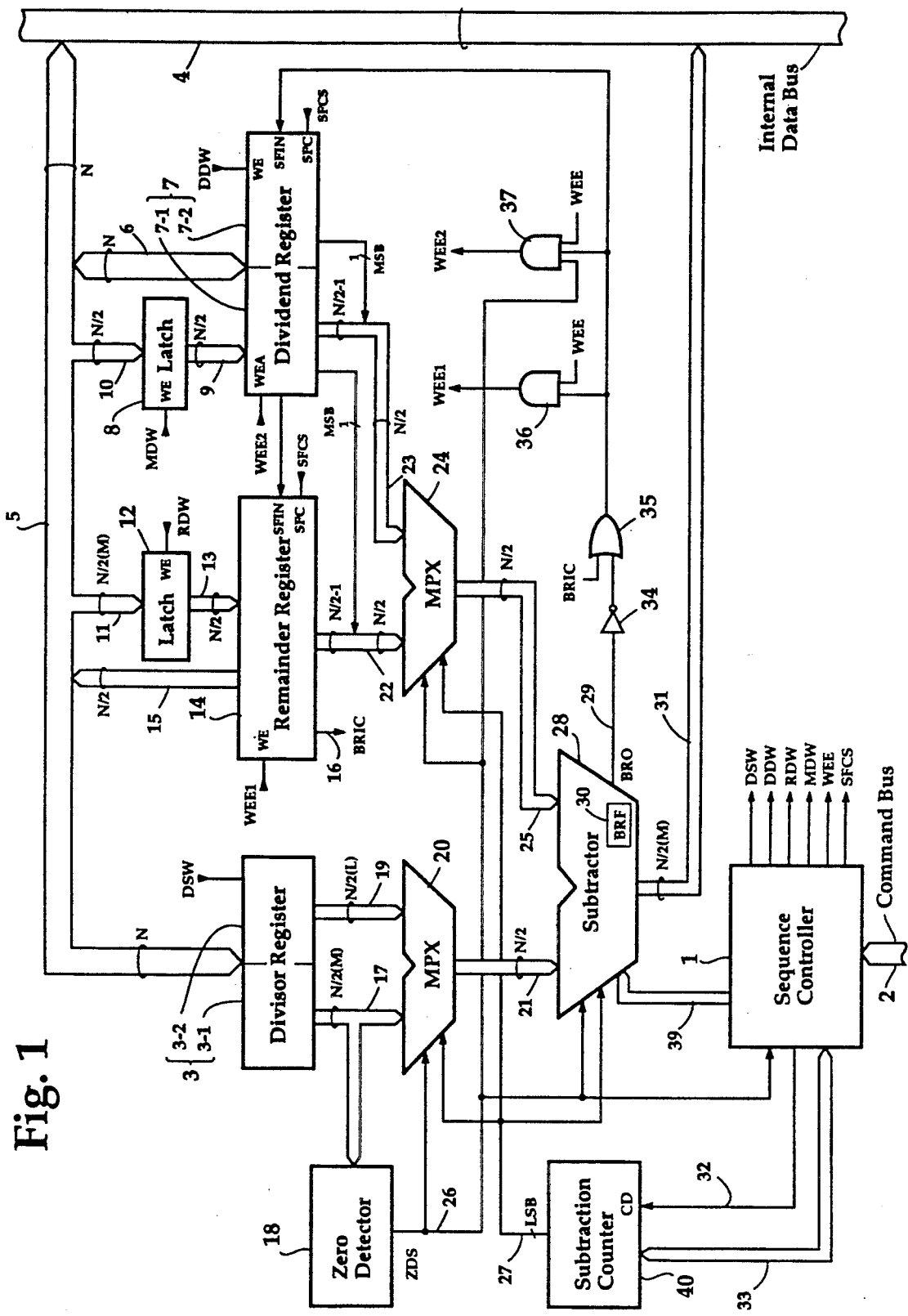
FIG. 1 is a step diagram of a digital division circuit according to an embodiment of the present invention.

Referring now to FIG. 1, there is shown a digital division circuit of the non-restoring type according to one embodiment of the present invention. The digital division circuit includes a sequence controller 1 which generates various write and shift control signals DSW, DDW, RDW, MDW, WEE and SFCS in accordance with a set of division commands supplied through a command bus 2. The write enable signal DSW is applied to the WE terminal of an N-bit divisor register 3 to store therein an N-bit divisor which is supplied from a data memory or a general purpose register set, not shown, by way of an N-bit wide internal data bus 4 and an N-bit wide data bus 5, so that the higher-bit data N/2(M) of the N-bit divisor are written into the higher-bit section 3-1 of the register 3 and the lower-bit data N/2(L) of the N-bit divisor are written into the lower-bit section 3-2 of the register 3. The write enable signal DDW is applied to the WE terminal of an N-bit dividend register 7 to write the higher-bit data N/2(M) of an N-bit dividend, which is also supplied through the buses 4 and 5, into the higher-bit section 7-1 of the register 7 and the lower-bit data N/2(L) of the dividend into the lower-bit section 7-2. The higher-bit section 7-1 of register 7 is provided with an additional write enable terminal WEA to which a write enable pulse WEE2 is applied from an AND gate 37 to cause (N/2)-bit data to be transferred from a data latch 8 to the higher-bit register section 7-1 through an N/2-bit-wide data bus 9. Data latch 8 is connected through an N/2-bit wide bus 10 to the higer-bit section of N-bit bus 5 to latch data from it in response to the write enable signal MDW.

A data latch 12 is connected through an N/2-bit bus 11 to the higher-bit section of N-bit bus 5 to latch data from it in response to a write enable signal RDW. The output of latch 12 is connected through an N/2-bit bus 13 to a remainder register 14 of N-bit length to which a write enable pulse WEE1 is supplied from an AND gate 36 to fetch data from the latch 12. The contents of registers 7 and 14 can be supplied to the data bus 4 through an N-bit bus 6 and an N/2-bit bus 15, respectively, in response to a read enable pulse, not shown, supplied from the sequence controller 1.

Each of the registers 7 and 14 has a shift enable terminal SFC to which the shift control signal SFCS is supplied from the sequence controller 1 to shift the bits stored therein by one bit to the left (toward them most significant position) so that, when register 7 receives a data bit through the shift-in terminal SFIN into the LSB position thereof, a data bit in the MSB position of register 7 is shifted out into the LSB position of register 14 and a data bit in the MSB position of register 14 is shifted out to an output lead 16. If the MSB of remainder register 14 is a "1", it is supplied as a "borrow" inhibit signal BRIC through lead 16 to an OR gate 35.

The N/2-bit divisor data from the higher-bit section 3-1 and lower-bit section 3-2 of divisor register 3 are supplied through buses 17 and 19 to first and second input terminals of a multiplexer 20, respectively. The higher N/2-bit divisor data is further applied to a zero detector 18 which produces a "0" output, or zero-detect signal ZDS when all the higher N/2 bits of the divisor are zero and produces a "1" if otherwise. Zero detector 18 may be implemented by an OR gate having N/2 inputs.

The (N/2)−1 bits of data stored in the N/2-bit remainder register 14 (except its MSB) and the MSB of the higher-bit section 7-1 of dividend register 7 are supplied through an N/2-bit bus 22 to the first input of a multiplexer 24, and the (N/2)−1 bits of data stored in the higher-bit section 7-1 of the N-bit dividend register 7 (except its MSB) and the MSB of the lower-bit section 7-2 are supplied through an N/2-bit bus 23 to the second input of the multiplexer 24.

For data selection, each multiplexer is responsive to two selection control signals suppplied thereto; one is the signal supplied on ZDS lead 26 from the zero detector 18 and the other is a signal supplied on lead 27 from the LSB output of a subtraction counter 40. With the ZDS lead 26 being at a "0" logic level (when all higher bits of a divisor are zero), multiplexers 20 and 24 select inputs from buses 19 and 22, respectively, regardless of the logic level of the LSB lead 27. With the ZDS lead 26 being "1", multiplexers 20 and 24 select inputs from buses 19 and 23 if the LSB lead 27 is "0", and select inputs from buses 17 and 22 if the LSB lead 27 is "1".

Figure 2:
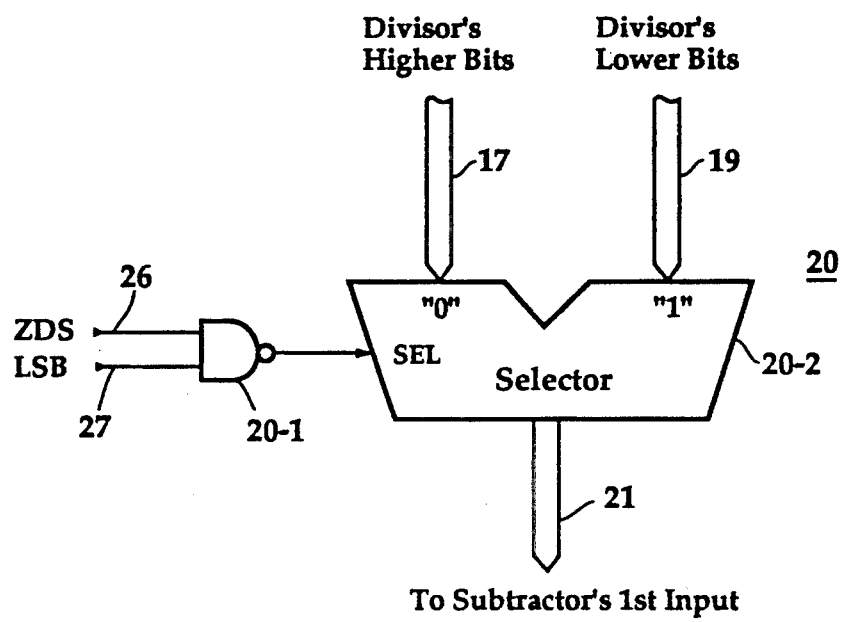
FIGS. 2 and 3 are circuit diagrams of the multiplexers of FIG. 1.
Figure 3:
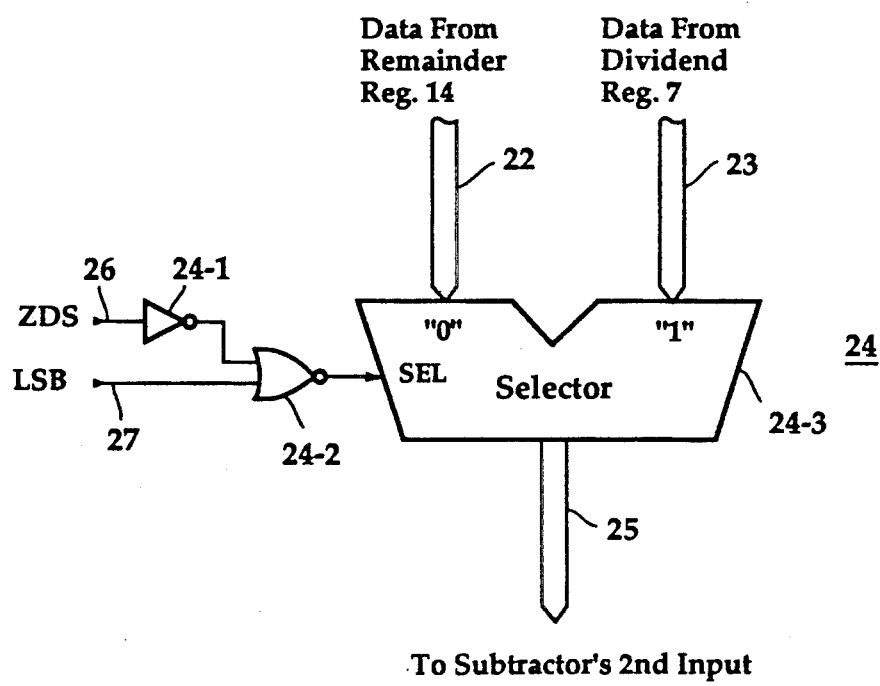

FIGS. 2 and 3 are illustrations of the details of multiplexers 20 and 24, respectively. multiplexer 20 is formed by a NAND gate 20-1 to which the signals from the ZDS lead 26 and LSB lead 27 are applied, the output of NAND gate 20-1 being applied to the SEL input terminal of a selector 20-2. In response to a "1" at the SEL input, the data on bus 19 is coupled to an N/2-bit output bus 21 and in response to a "0" at the SEL input, the data on bus 17 is coupled to the output bus 21. Multiplexer 24 comprises an inverter 24-1 for inverting the signal at the ZDS lead 26, and a NOR gate 24-2 to which the signal from the inverter 24-1 and the LSB lead 27 are applied. The output of NOR gate 24-2 is applied to the SEL input of a selector 24-3. In response to a "1" at the SEL input, the data on bus 23 is coupled to an N/2-bit output bus 25 and in response to a "0" at the SEL input, the data on bus 22 is coupled to the output bus 25.

Returning to FIG. 1, the output data from multiplexers 20 and 24 are supplied respectively through buses 21 and 25 to an N/2-bit subtractor 28, which provides subtraction of N/2-bit data from multiplexer 20 from N/2-bit data from multiplexer 24 and supplies the result of the subtraction through an N/2-bit bus 31 to the higher-bit section of internal bus 4. If the multiplexer 20 output is successfully subtracted from the multiplexer 24 output, a "0" is generated at a "borrow" (BRO) output terminal 29. Subtractor 28 has a borrow flag (BRF) 30 which is enabled when the higher bits n/2(M) of a divisor are not all zero and is disabled when they are all zero. Initialization and execution commands are passed from sequence controller 1 through a control bus 39 to subtractor 28 to cause it to initialize its internal state and perform a subtraction operation. The signal at borrow terminal 29 is inverted by an inverter 34 and fed through OR gate 35 to the shift input SFIN of dividend register 7. The borrow inhibit signal BRIC from the MSB of remainder register 14 forces the output of OR gate 35 to go high to inhibit the borrow output on lead 29 from subtractor 28.

In order to generate write enable pulses WEE1 and WEE2, the output of OR gate 35 is also applied to AND gates 36 and 37 to which the write enable signal WEE is supplied from sequence controller 1. A further input is supplied to AND gate 37 from zero detector 18. When subtractor 28 is generating no borrow output (i.e., a "0" at terminal 29) or when remainder register 14 is generating a borrow inhibit signal BRIC (logic 1) pulses WEE1 and WEE2 are supplied to registers 14 and register section 7-1, respectively, from AND gates 36, 37 in response to the application of the write enable signal WEE to AND gates 36, 37 so that data are transferred from latches 12 and 8 into register 14 and register section 7-1. However, the pulse WEE 2 is not supplied to register section 7-1 when a "0" is applied to AND gate 37 from zero detector 18.

Subtraction counter 40 is preset with a subtraction count value supplied from sequence controller 1 by way of a bidirectional data bus 33. The preset value of the counter 40 is decremented by one in response to a count-down signal supplied to its count-down terminal CD through lead 32 from the sequence controller. Sequential controller 1 monitors the instantaneous value of counter 40 through data bus 33.

The operation of the sequence controller 1 of FIG. 1 will be given below with reference to a flowchart of FIG. 4. When sequence controller 1 receives division commands through bus 2, program execution starts with step 41 in which the divisor and dividend registers 3 and 7 are enabled in response to write enable pulses DSW and DDW to be set with a divisor and a dividend, respectively. Exit then is to step 42 which directs the presetting of subtraction counter 40 with a value equal to the number of bits contained in each of the divisor and dividend, i.e., N. Remainder register 14 and data latches 8 and 12 are cleared (step 43). Control proceeds to decision step 44 to check to see if there is a zero-detect signal (ZDS =0) indicating that the higher bits of the divisor stored in register section 3-1 are all zero. If there is one, exit is to step 45 to enable the subtractor 28 to execute a subtraction command.

Assume that the divisor is an 8-bit value "00001100" (=decimal 12) and the dividend is an 8-bit value "01010101" (=decimal 85). Since the higher four bits of the divisor are all zero, a "0" appears at the output of zero detector 18. Subtraction counter 40 is preset with a four-bit code "1000" indicating that the operands are of 8-bits. Multiplexer 20 selects the lower four bits "1100" of the divisor in response to the "0" output of zero detector 18 and multiplexer 24 selects the lower three bits (=000) of register 14 and the MSB (=0) of register section 7-1 which are combined and transferred through bus 22. As a result, the division circuit assumes initial conditions as given in the first row (state 0) of FIG. 5.

In step 45, sequence controller 1 issues a subtraction command signal through bus 39 to the subtractor 28 to cause it to subtract "1100" from "0000". As a result, a "1" (borrow) appears at the output terminal 29 and a result of the subtraction "0100" appears on the subtractor output bus 31. Sequence controller 1 applies a write enable signal RDW to the data latch 12 to load the output data "0100" thereinto (step 46). A shift control pulse SFCS is then applied to dividend and remainder registers 7 and 14 (step 47). Since the borrow output is inverted to "0" by inverter 34 and the MSB of remainder register 14 at terminal 16 is also "0", the output of OR gate 35 is forced to "0", so that dividend register 7 is one-bit shifted to the left in response to the shift control pulse SFCS while writing a "0" read from dividend register 7 into the LSB position of remainder register 14. Sequence controller 1 then generates a write enable signal WEE (signal 48). However, as described above, the logic-0 output of OR gate 35 prevents AND gates 36 and 37 from reponding to the write enable pulse WEE and hence, write pulses WEE1 and WEE2 are not generated. Under this condition, the division circuit changes to state 1 as given in FIG. 5. Control then proceeds to step 49 to apply a count-dowm pulse from controller 1 through lead 32 to subtraction counter 40 to cause it to be decremented by one. Exit then is to decision step 50 to determine if the subtraction counter 40 has been decremented to zero. If the answer is negative, control returns to decision step 44 to repeat the subtraction operations.

Sequence controller 1 proceeds through state 2 to state 4 in a manner similar to that described above until counter 40 is decremented to "0011", whereupon the division circuit proceeds to state 5 as shown in FIG. 5. The data stored in remainder and dividend registers 14 and 7 now assume "1010" and "10100000", respectively, and hence "1100" and "0101" appear at the outputs of multiplexers 20 and 24, respectively. As the subtractor 28 performs a calculation of the binary numbers "0101"-"1100", a borrow output (logic-1) appears at the output terminal 29 and a result of the subtraction "1001" is produced (step 45) and stored into latch 12 (step 46), followed by the generation of a shift control signal SFCS (step 47). Since the MSB of remainder register 14 is at now logic-1, the output of OR gater 35 is "1", and a "1" is stored into the LSB of dividend register 7 while it is shifted to the left one bit position in response to the shift control signal. As a result, dividend register 7 is updated to "01000001". The logic-1 output of OR gate 35 allows AND gate 36 to respond to a write pulse WEE which is generated as step 48 is executed. Thus, a write pulse WEE1 is applied from AND gate 36 to remainder register 14 to fetch "1001" from latch 12. Therefore, when the counter 40 is decremented to "0010", the contents of registers 7, 14 and multiplexer 24 are as given by state 6.

The next subtraction is a calculation of binary numbers 0010–1100, which results in the generation of a borrow output which is inhibited by the MSB (BRIC) of register 14. Therefore, when the subtraction counter 40 is decremented to "0001", the contents of registers 14, 7, latch 12 and multiplexer 24 are "0110", "1000011", "0110" and "1101", respectively, as indicated by state 7, FIG. 5. Subsequently, a calculation of binary numbers "1101"–"1100" is performed and the result of this calculation, i.e., "0001" is stored into latch 12. Since the borrow output terminal 29 is at logic-0 at this moment, register 7 responds to a shift control signal SFCS by storing "00000111" and register 14 responds to a pulse WEE1 from AND gate 36 by fetching from latch 12 "0001" as given by state 8. Subtraction counter 40 is decremented to "0000", which is detected as control executes decision step 50.

Control now advances to step 51 in which the sequence controller 1 reads out the contents of register 7 as an 8-bit quotient and reads the content of register 14 as lower four bits of a remainder. Since the divisor is decimal "12" and the dividend is decimal "85", decimal "7" and "1" are respectively obtained for the quotient and the remainder of the division calculation.

Another example of division calculation will be described below using a different value for a divisor, i.e., "00101100" (=decimal 44) and the same value for a dividend as used in the previous example, i.e., "01010101" (decimal=85). Control proceeds through steps 41 to 43 as in the previous example. However, execution of decision step 44 reveals that the output terminal 26 (ZDS) of zero detector 18 is at logic-1, and hence control goes to step 52 to enable the subtractor 28 to perform a subtraction operation. As described earlier, the operation of multiplexers 20 and 24 depends on the logic state of the LSB output of subtraction counter 40 in addition to the output of zero detector 18. At this moment, the LSB output of counter 40 at terminal 27 is at logic-0 as the counter 40 is in an initialized state. Hence, multiplexer 20 selects the lower four bits "1100" of the divisor and multiplexer 24 selects "1010" which appears on bus 23 from the lower three bits of the higher-bit register section 7-1 and the MSB of the lower-bit register section 7-2 as indicated by state 00 in FIG. 6. Execution of step 52 involves a calculation of binary numbers 1010–1100, thus giving a subtractor output "0110", which is then written into the latch 8 as step 53 is executed. A borrow output (logic-1) is generated from this calculation and the borrow flag 30 is set in response thereto.

Control advances to step 54 to decrement the subtraction counter 40 to "0111". As a result, the LSB output of counter 40 now switches to logic-1, and multiplexers 20 and 24 select "0010" (higher four bits of divisor) and "0000" (data from the lower three bit positions of remainder register 14 and the MSB of register 7-1), respectively, as indicated by state 01 in FIG. 6. Control then proceeds to step 45 to perform a subtraction. Because of the borrow flag 30 being set to logic-1, a "1" is added to the LSB of the binary data "0010" supplied from multiplexer 20 and, hence, the subtraction to be performed is a calculation "0000"–"0011". This results in a binary number "1101", which is stored into the data latch 12 (step 46), as well as logic-1 borrow output at terminal 29. With a logic-1 output from zero detector 18 and a logic-1 LSB output from counter 40 being supplied, the subtractor 28 is now capable of deciding whether the logic-1 borrow is to be used to set the borrow flag 30 or made to appear at terminal 29. A shift control signal SFCS is then generated as step 47 is executed, so that the contents of registers 7 and 14 are one-bit shifted to the left, a "0" is written into the LSB of register 7 and the MSB of the latter is read therefrom into the LSB of register 14. In steps 48, a data write pulse WEE is generated, but logic-0 output of OR gate 34 prevents AND gates 36 and 37 from generating their outputs WEE1 and WEE2. A decrement of counter 40 (step 49) changes its count value to "0110", and hence the LSB output at terminal 27 now switches to logic-0. After executing steps 50 and 44 in succession, control proceeds to step 52 again to repeat a subtraction. At this moment, registers 14, 7, latches 12 and 8 assume binary numbers "0000", "10101010", "1101" and "0110", respectively, as indicated by state 02 in FIG. 6 and the outputs of multiplexers 20 and 24 assume binary numbers "1100" and "0101", respectively.

Thus, successive execution of steps 52 to 54 results in binary numbers as given by state 03, FIG. 6, and subsequent execution of steps 45 to 49 results in binary numbers as given by state 04. After execution of steps 50 and 44, control executes steps 52 to 54 again, which results in binary numbers as given by state 05. A sequence of operations that follows, involving execution of steps 45 to 49, gives a result as indicated by state 06. When counter 40 has been decremented to "0001", registers 7, 14 and latches 12 and 8 assume binary numbers "0010", "10101000", "1111" and "1001", respectively, and the outputs of multiplexers 20 and 24 indicate "0010" and "0101", respectively, as given by state 07. At this stage of the calculation process, a "1" is stored in the borrow flag 30. Subsequent execution of step 45 involves a calculation of binary numbers "0101"–"0011". This results in a binary number "0010", which is stored into latch 12 (step 46), and no borrow output is generated and hence the terminal 29 is forced to logic-0. As a result, the generation of a shift control signal SFCS by subsequent execution of step 47 causes registers 14 and 7 to assume binary numbers "0101" and "01010001", respectively, and the generation of a signal WEE by execution of the next step 48 causes AND gates 36 and 37 to generate their outputs WEE1 and WEE2, which in turn causes registers 14 and 7 to change their contents to "0010" and "01010001", respectively. Since subsequent execution of step 49 causes the counter 40 to be decremented to "0000", affirmative decision is made in step 50 and control advances to step 51 to access the remainder and dividend registers 14 and 7. The four-bit data of register 14 and the higher four bits of register 7 are now treated as an 8-bit remainder of the division and the lower four-bit data of register 7 is treated as a lower four-bit data of the quotient of the division. The higher four-bit data of the quotient is, in this case, "0000". As shown in FIG. 6, the quotient of the division is a binary number "00000001" (=decimal 1) and the remainder is a binary number "00101001" (=decimal 41), which agree with the quotient and remainder derived from a calculation that divides decimal number 85 with decimal number 44.

It will be seen therefore that N/2-bit subtractor 28 is capable of dividing N-bit length dividends with N-bit length divisors by repeating subtractions N times.

Figure 7:
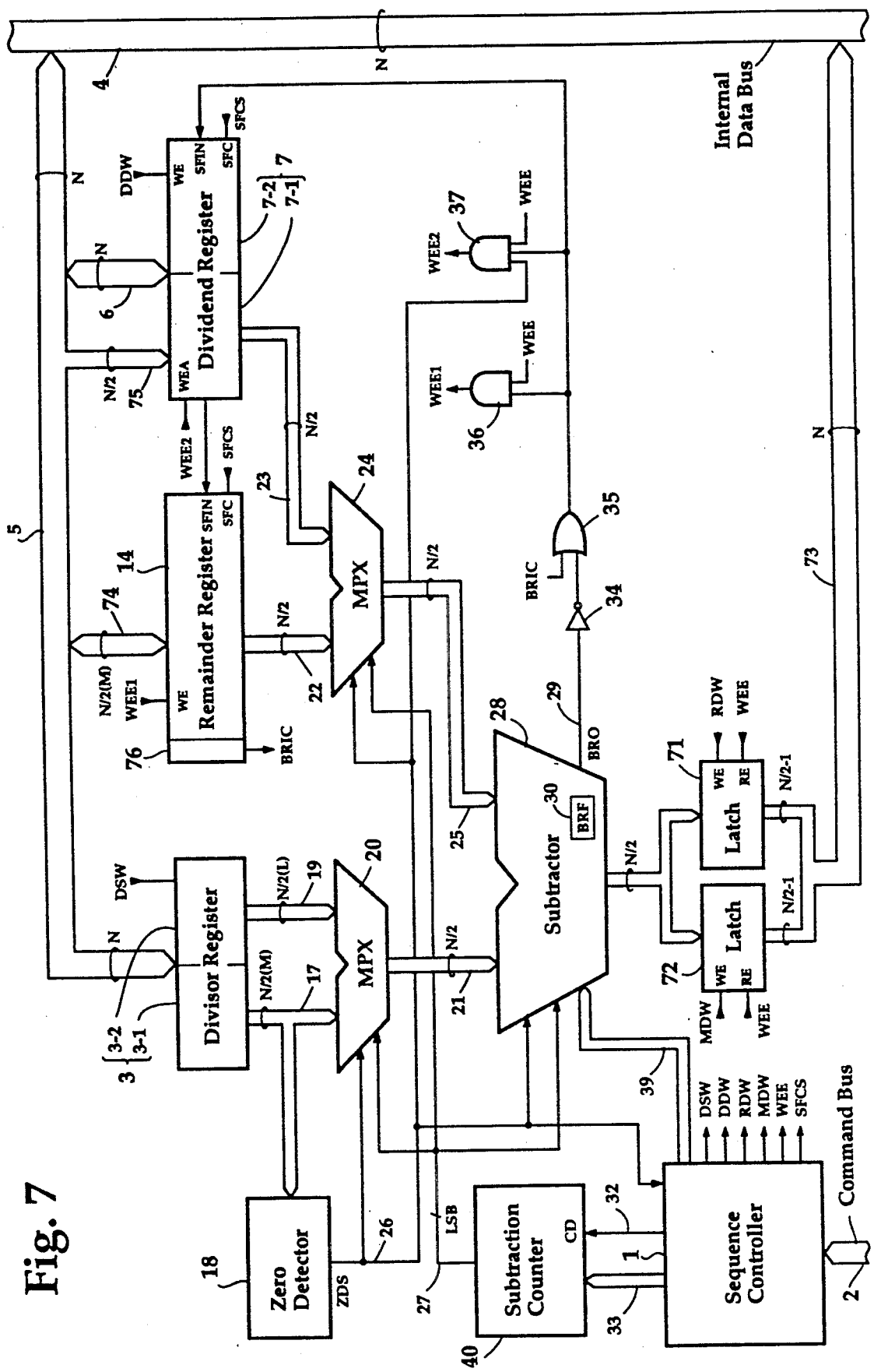
FIG. 7 is a step diagram of an alternative embodiment of the present invention.

FIG. 7 is a flow diagram of an alternative embodiment of the present invention in which parts corresponding to those in FIG. 1 are marked with the same numerals as used in FIG. 1 and have the same significance as those in FIG. 1. In this embodiment, data latches 71 and 72 are connected between the output of subtractor 28 and the internal data bus 4. Latches 71 and 72 are respectively arranged to respond to the signals RDW and MDW by latching the output of subtractor 28 and to respond to the signal WEE by delivering their latched outputs through an N-bit output bus 73, so that the output of latch 71 is coupled to the higher N/2-bit lines of data bus 4 and the output of latch 72 is coupled to the lower N/2-bit lines of the bus 4. By the provision of latches 71 and 72, the remainder register 14 is connected by an N/2-bit input/output bus 74 to the higher N/2-bit lines of the data bus 5 and hence to bus 4 and the higher register section 7-1 is connected by an N/2-bit input/output bus 75 to the lower N/2-bit lines of the data bus 5 and thence to bus 4. In addition, this modification differs from the previous embodiment in that the N/2-bit data of remainder register 14 is the only data that is applied through bus 22 to one input port of multiplexer 24 and the N/2-bit data of the higher-bit section 7-1 of dividend register 7 is the only data that is applied through bus 23 to the other input terminal of multiplexer 24. Remainder register 14 of this embodiment differs from the remainder register of FIG. 1 by the provision of an additional one-bit stage 76 at the MSB position from which a borrow inhibit signal BRIC is extracted.

Sequence controller 1 is programmed as shown in a flowchart of FIG. 8. On receiving a division command through bus 2, sequence controller 1 starts program execution. The flowchart of FIG. 8 is generally similar to that of FIG. 4, the description of FIG. 8 being limited only to variations. Since the content of register 14 and the higher bits of register 7 are the sole inputs to multiplexer 24, a shift control signal SCFS is applied to these registers (step 84) as a pre-processing operation immediately after the register 14 and latches 71 and 72 are cleared (step 83). As a result of this pre-processing operation, the digit in the MSB of the higher-bit section 7-1 is shifted to the LSB of register 14, and the digit in the MSB of lower-bit section 7-2 is shifted to the LSB of the higher-bit section 7-1. Therefore, the embodiment of FIG. 8 is equivalent to that of FIG. 1. Subtraction operations actually begin following a one-bit shift and therefore shift control signal SFCS is generated after a data write signal WEE is generated as indicated by steps 88 and 89 which are reverse in the order of execution to that of steps 47 and 48 of FIG. 4.

The foregoing description shows only preferred embodiments of the present invention. Various modifications are apparent to those skilled in the art without departing from the scope of the present invention which is only limited by the appended claims. For example, the present invention could equally well be employed in applications in which the subtractor is of N/3-or N/4-bit length.

What is claimed is:

1. A digital division circuit for dividing a dividend by a divisor in accordance with a non-restoring method, comprising:

a first register having a data shift function for temporarily storing said dividend;
a second register for temporarily storing said divisor;
a third register having a data shift function,
a subtractor,
a zero detector for monitoring higher-bit data of said divisor in said second register and for generating a signal when the monitored higher-bit data is all zero;
a first multiplexer connected between said second register and a first input terminal of said subtractor for supplying lower-bit data of said divisor to said subtractor in response to the signal from said zero detector and for selectively supplying lower-bit and higher-bit data of said divisor to said subtractor for each subtraction operation thereof in the absence of the signal from said zero detector; and
a second multiplexer connected between said first and third registers and a second input terminal of said subtractor for supplying the contents of said third register to said subtractor in the presence of the signal from the zero detector and for selectively supplying higher-bit data of the contents of said third and first registers to said subtractor for each subtraction thereof in the absence of the signal from said zero detector.

2. A digital division circuit as claimed in claim 1, wherein each of the first and second registers has N-bit length and the third register has N/M-bit length, and the subtractor has N/M-bit length, wherein M is an integer equal to or greater than 2 and smaller than N.

3. A division circuit comprising:

an N-bit divisor register for storing therein an N-bit divisor;
an N-bit dividend register for storing therein an N-bit dividend;
an N/2-bit remainder register for storing a bit supplied from the most significant bit position of the N bit dividend register into the least significant bit position of the N-bit dividend register;
a zero detector for monitoring a higher-bit segment of the N-bit divisor in said N-bit divisor register and generating a signal indicating that the higher-bit segment of the N-bit divisor is all "0"s;
a subtractor responsive to the presence of the signal from the zero detector for subtracting in a first sequence of subtractions a lower-bit segment of data in the N-bit divisor register and data in the N/2-bit remainder register and for writing an output generated from each subtraction in said first sequence of subtractions into the first N/2-bit latch, and responsive to the absence of said signal from the zero detector for subtracting, in a second sequence of subtractions, a lower-bit segment of data in the N-bit divisor register from a higher-bit segment of data in the N-bit dividend register and for subtracting a higher-bit segment of data in the N-bit divisor register and data in the N/2-bit remainder register and for writing successive outputs into the second and first N/2-bit latches, respectively, and for outputting a borrow bit whenever said subtractions are not successful;
sequence control means responsive to said first sequence of subtractions for shifting bits in the N/2-bit remainder and the N-bit dividend registers by one bit position toward the MSB positions thereof and for reading data from the first n/2-bit latch into the N/2-bit remainder register either when a "1"

appears in the MSB position of the N/2-bit remainder register or when said borrow bit is not generated by the subtractor, deriving a quotient and a remainder from said N-bit dividend and N/2-bit remainder registers, respectively, when said first sequence of subtractions is repeated N times; and responsive to said second sequence of subtractions for shifting bits in said N/2-bit remainder register and said N-bit dividend register by one bit position toward the MSB positions thereof, adding a "1" to the LSB position of the higher-bit segment of data from the N-bit divisor register in response to said borrow bit, reading data from said first and second n/2-bit latches into said N/2-bit remainder register and said N-bit dividend register, respectively, and deriving a quotient from the N-bit dividend register and a remainder from the N/2-bit remainder register and the N-bit dividend register when the subtractions in said sequence are repeated a total of N times; and logic gate means for writing a "1" into the LSB position of said N-bit dividend register in response to a "1" in the MSB position of said N/2-bit remainder register or in response to the absence of said borrow bit.

4. A division method comprising the steps of:

(a) storing an N-bit divisor into an N-bit divisor register and storing an N-bit dividend into an N-bit dividend register;

(b) monitoring a higher-bit segment of the N-bit divisor in said N-bit divisor register and generating a signal indicating that the higher-bit segment of the N-bit divisor is all "0"s;

(c) responsive to the presence of the signal generated by the step (b);

($c_1$) providing subtraction between a lower-bit segment of data in the N-bit divisor register and data in an N/2-bit remainder register;

($c_2$) writing an N/2-bit output of the subtracting step $c_1$ into a first N/2-bit latch, writing a "1" into the LSB position of the N-bit dividend register in response to a "1" bit in the most significant bit position of the N/2-bit remainder register and shifting bits stored in the N-bit dividend register by one bit position toward the MSB positions thereof and shifting the MSB position of the N-bit dividend register into the LSB position of said N/2-bit remainder register;

($c_3$) reading data from the first N/2-bit latch into said N/2-bit remainder register in response to the absence of a borrow bit or in response to a "1" bit in the MSB position of the N/2-bit remainder register;

($c_4$) repeating the steps to; and ($c_5$) deriving a quotient from the N-bit dividend register and a remainder from the N/2-bit remainder register when the step ($c_1$) is repeated N times; and (d) responsive to the absence of the signal generated by the step;

($d_1$) providing subtraction between a lower-bit segment of data in said N-bit divisor register and a higher-bit segment of data in said N-bit dividend register;

($d_2$) providing subtraction between a higher-bit segment of data in said N-bit divisor register and data in said (N2-bit remainder register;

($d_3$) writing N/2-bit successive results of the subtractions into a second N/2-bit latch and said first N/2-bit latch, respectively, and shifting bits in the N-bit dividend register by one bit position toward the MSB positions thereof and shifting the MSB position of the N-bit dividend register into said N/2-bit remainder register;

($d_4$) adding a "1" to the LSB position of the higher-bit segment data of the N-bit divisor register in response to a borrow bit produced by the subtraction;

($d_5$) writing a "1" into the LSB position of said N-bit divident register in response to a "1" in the MSB position of said N/2-bit remainder register or in response to the absence of said borrow bit N/2-bit;

($d_6$) repeating the steps ($d_1$) to ($d_5$); and ($d_7$) reading data from said first and second N/2-bit latches into said N/2-bit remainder register and said N-bit dividend register, respectively, and deriving a quotient from the N-bit dividend register and a remainder from the N/2-bit remainder register and the N-bit dividend register when the steps ($d_1$) and ($d_2$) are repeated a total of N times.

* * * * *